United States Patent [19]

Gazeley

[11] Patent Number: 4,659,196
[45] Date of Patent: Apr. 21, 1987

[54] OPTICAL ACCESSORY FOR USE WITH SPECTACLES

[75] Inventor: Albert E. Gazeley, San Po Kong, Hong Kong

[73] Assignee: Polaroid Corporation, Cambridge, Mass.

[21] Appl. No.: 706,458

[22] Filed: Feb. 28, 1985

[51] Int. Cl.[4] .......................... G02C 9/00; G02C 7/08
[52] U.S. Cl. ........................................ 351/57; 351/58; 351/47
[58] Field of Search ........................ 351/47, 48, 57, 58

[56] References Cited

U.S. PATENT DOCUMENTS

| | | |
|---|---|---|
| De. 197,305 | 1/1964 | Magnuson et al. |
| 716,194 | 12/1902 | Conn . |
| 1,348,713 | 8/1920 | Gitterman . |
| 2,159,710 | 5/1939 | Reichert . |
| 2,580,859 | 1/1952 | Steckler . |
| 2,602,372 | 7/1952 | Passet . |
| 2,607,919 | 8/1952 | Stegeman . |
| 2,696,141 | 12/1954 | Hurst . |
| 2,949,609 | 8/1960 | Sager . |
| 2,976,767 | 3/1961 | McNeill . |
| 2,981,956 | 5/1961 | Thompson . |
| 3,092,838 | 6/1963 | Vacha . |
| 3,238,005 | 3/1966 | Petitto . |
| 3,345,121 | 10/1967 | DeAngelis . |
| 3,453,042 | 7/1969 | Cooper . |
| 3,555,563 | 1/1971 | Grossman . |
| 3,604,013 | 9/1971 | Hammond . |
| 3,741,634 | 6/1973 | Stoltze . |
| 3,890,037 | 6/1975 | Zingarelli . |
| 3,944,346 | 3/1976 | Shindler . |
| 3,958,867 | 5/1976 | Morgan . |
| 3,981,569 | 9/1976 | Morgan . |
| 4,012,129 | 3/1977 | Byler . |
| 4,176,921 | 12/1979 | Matthias . |
| 4,217,037 | 8/1980 | Lemelson . |
| 4,247,178 | 1/1981 | Cook ..................................... 351/47 |
| 4,253,745 | 3/1981 | Bizzarri . |
| 4,322,138 | 3/1982 | Minart, Sr. . |
| 4,338,004 | 7/1982 | Vosper . |
| 4,402,577 | 9/1983 | Minart . |
| 4,402,578 | 9/1983 | Minart . |
| 4,405,214 | 9/1983 | Bolle . |
| 4,504,127 | 3/1985 | Cottet . |

OTHER PUBLICATIONS

Optical Journal and Review of Optometry, vol. XCI, No. 7, Apr. 1, 1954, p. 55.
World Patent Abstracts, Weeks 8443, 8442, See p. 3, P81 and 5, Dec. 1984, Optics, Photography, See p. 4, P81.

Primary Examiner—Rodney B. Bovernick
Attorney, Agent, or Firm—Leslie J. Payne

[57] ABSTRACT

There is disclosed an improved optical accessory of the sun shade type for use with a pair of prescription spectacles. The accessory includes a bridging assembly having a resiliently flexible wire-like member which cooperates releasably with a brow bar on the spectacles, and allows a finger to releasably cooperate with the bottom of a nose bridge of the spectacles.

7 Claims, 4 Drawing Figures

OPTICAL ACCESSORY FOR USE WITH SPECTACLES

BACKGROUND OF THE INVENTION

Optical accessories for use in combination with spectacles exist for a wide variety of reasons. Sunglass accessories, for instance, generally permit optimum use of the spectacles under varying lighting conditions. Other optical accessories provide, for example, eye shielding and vision correcting functions.

A number of factors are considered important in constructing such accessories. In this regard, it is desirable to have the optical elements of the accessory positioned in correct superposed relationship to the optical members of the spectacles for proper usage and convenience. In many instances, it is highly desirable to avoid unnecessary movement of the accessory relative to the spectacle frame. Moreover, facilitating quick, easy and reliable mounting and demounting of the accessory are of practical importance. Significantly, it is desirable to have these mounting arrangements as aesthetic as possible. Unaesthetic mounting arrangements, of course, detract appreciably from the commercial appeal of succh accessories. Furthermore, in the highly competitive spectacle accessory field need exists to provide the foregoing features as simply, economically and efficiently as possible.

Mounting arrangements for releasably attaching optical accessories to spectacle frames are significant structural features of these accessories. The following are exemplary of prior art optical accessories and their associated releasable mounting arrangements: U.S. Pat. Nos. 1,348,713; 2,580,859; 2,607,919; 2,696,141; 2,949,609; 2,981,956; 3,092,838; 3,238,005; 3,345,121; 3,453,042; 3,555,563; 3,604,013; 3,741,634; 3,890,037; 3,944,346; 3,981,569; 4,012,129; 4,176,921; 4,253,745; 4,322,138; 4,338,004; 4,402,577; 4,402,578; and 4,405,214.

Known optical accessories exhibit a number of deficiencies in connection with the foregoing enumerated design factors. Moreover, most of such accessories have specially constructed frames to be attached to in order to work effectively. Accordingly, they are not compatible with many kinds of existing frames commercially sold. Furthermore, these specially constructed spectacles often appear unattractive when the accessories are removed therefrom.

SUMMARY OF THE INVENTION

It is an object of the present invention to provide an improved optical accessory for use in combination with a pair of spectacles.

The spectacles is of the prescription glass type including a pair of optical elements; a pair of frames, each mounting one of the optical elements, a nose bridge serving to space the optical elements apart and means for providing an abutment extending above each of the frames. The accessory includes a pair of optical members and means for connecting these optical members in spaced apart orientation. A rearwardly extending projection is adapted to extend under and rest against the nose bridge of the prescription glasses when the optical members are operably positioned with respect to the optical elements of the glasses. Means are provided for firmly engaging the edges of the abutments and for exerting a downwardly directed force against both frames of the glasses and urge the projection against the nose bridge of the glasses when the optical members are operably positioned with respect to the optical elements.

Among the other objects of the present invention are therefore, the provision of an improved optical accessory for use in combination with prescription spectacles wherein the accessory is easily attached and detached therefrom; the provision of an improved accessory of the foregoing type having easily releasable securing means which are accurately and securely mounted with respect to the spectacles; and, the provision of an optical accessory of the sun shade type having an improved mounting arrangement which is simple in construction and economical to manufacture.

Other objects and further scope of applicability of the present invention will become apparent from the detailed description to follow when taken in conjunction with the accompanying drawings in which like parts are designated by like reference numerals.

DETAILED DESCRIPTION

Figure 1:
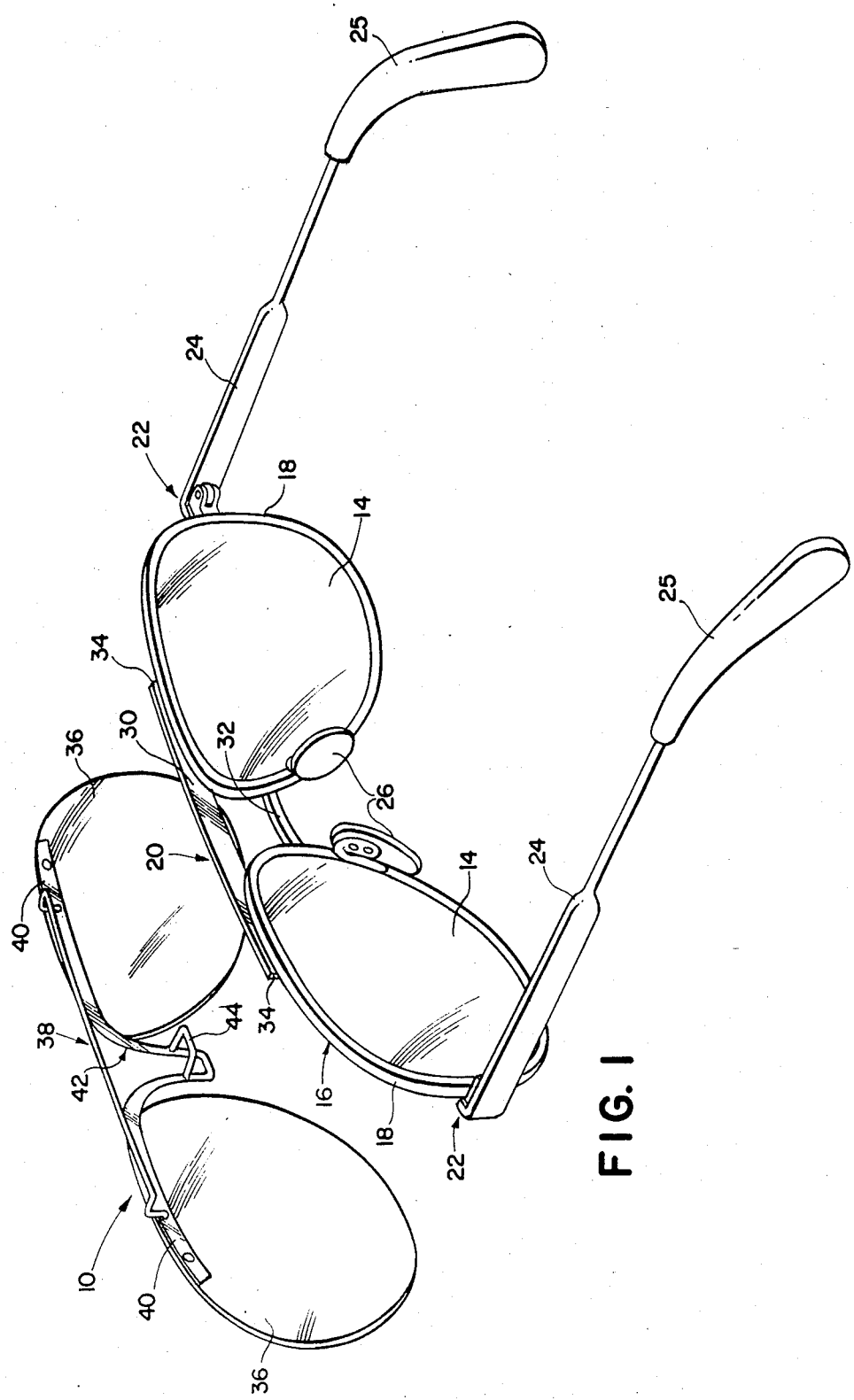
FIG. 1 is an exploded perspective view of an improved optical accessory in combination with a pair of spectacles made in accordance with the present invention.
Figure 2:
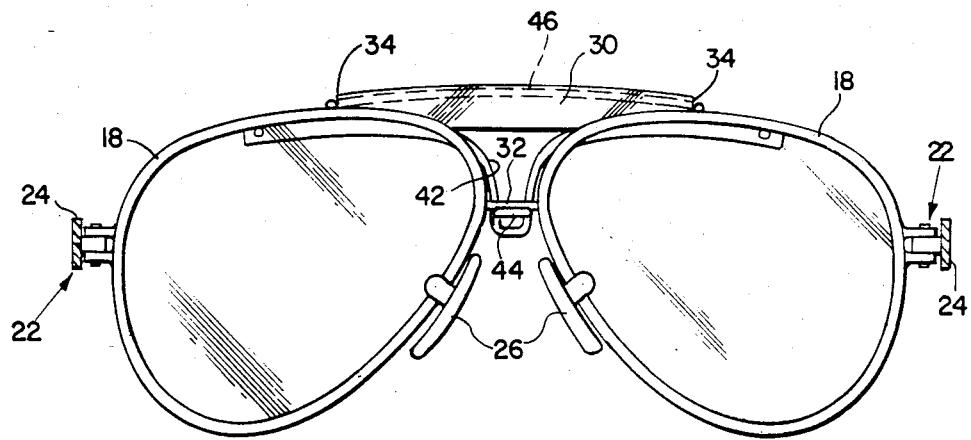
FIG. 2 is an elevational view showing the optical accessory and the spectacles joined together.

Reference is now made to the drawings for showing the improved optical accessory 10 of the present invention for use in combination with a pair of spectacles 12 such as of the type shown in FIG. 1. In this embodiment, the optical accessory 10 is a sun shade device.

As illustrated, the spectacles 12 can be of the prescription glasses type and include prescription lenses 14 which are secured to a frame assembly 16.

In this embodiment, the frame assembly 16 is a conventional metallic type including a pair of lens rims or frames 18. The frames 18 are spaced apart from each other and are connected by a central bridging assembly 20. Attached as by temple hinges and lugs, generally indicated at 22, to the outward lateral sides of the frames 18 are conventional temple pieces 24 which have ear tips 25 engagable with the ears of a wearer. Attached to inward lateral sides of the lens frames 18 is a pair of conventional opposing nose pads 26.

Reference is again made to the central bridging assembly 20. In this embodiment, it includes a generally horizontally extending brow bar 30 and spaced therefrom in generally parallel relationship a nose bridge 32. As more clearly shown in FIGS. 1 and 3 the brow bar 30 is forwardly extending of and upwardly protruding from the frames 18. Opposite ends of the brow bar define abutments 34 which as best shown in FIG. 3 cooperate with the accessory in a manner to be more fully described.

Reference is made to again to the sun shade device 10. Included in the sun-shade device 10 is a pair of sun shades 36 which is adapted to protect the eyes from the sun. For connecting the sun shades 36 in spaced apart orientation there is provided a sun shade bridging assembly 38. The bridging assembly 38 is comprised of an integral connecting member 40 having its opposite rim ends riveted to the upper marginal edges of each of the sun shades 36. Central of the connecting member 40 is a downwardly projecting finger 42 having a rearwardly extending latching projection 44, which as will be described, cooperates with the nose bridge 32 for assisting in attaching the sun shade accessory 10.

Rearwardly extending from the connecting member 40 is a yieldable and resilient wire-like retaining member 46 arranged to resiliently exert the downwardly directed forces against the frames 18 when the sun shades 36 are operatively positioned with respect to the lenses 14. Also, the resilient retaining wire 46 serves to upwardly bias projection 44 on the finger 42 against the bottom of the nose bridge 32. During attachment of the sun shade accessory 10 the retaining member 46 has its distal ends cooperate with the spaced apart abutments 34, such as shown in FIG. 3. This cooperation limits lateral displacement of the accessory 10. In the unstressed condition, the retaining wire 46 and the projection 44 have a dimension less than that existing between the top of the brow bar 30 and the bottom surface of the nose bridge 32. During attachment the resilient retaining wire 46 is flexed downwardly to allow the latching projection 44 to slide over and bear against the nose bridge. In this stressed condition the retaining wire 46 bears down on the frames 18. The projection 44 has a depression arranged to cooperate with the nose bridge 32 so as to facilitate securing of the sun shade accessory 10. The bottom of the finger 42 which extends below the projection 44 serves as a finger gripping portion that allows a user's finger to grasp and remove the accessory 10 by pulling the projection from the nose bridge 32. During this removal the resilient retaining wire 46 flexes to allow such action. Thereafter, the sun shade accessory 10 is lifted so that retaining corners formed by the retaining wire 46 can be lifted from the abutments 34.

Figure 3:
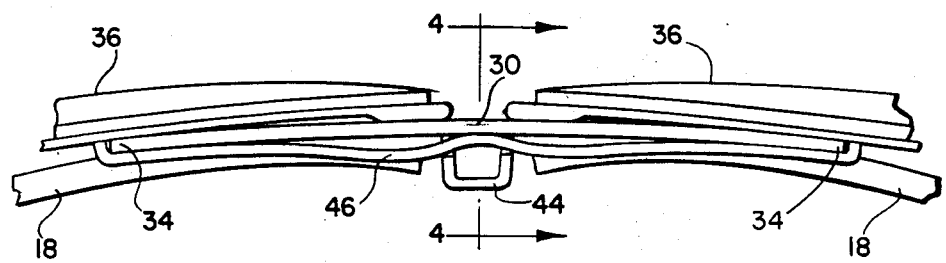
FIG. 3 is an enlarged fragmented plan view showing the releasable connection between the accessory and the spectacles; and, FIG. 4 is a cross-sectional view taken along section lines 4—4 appearing in FIG. 3.
Figure 4:
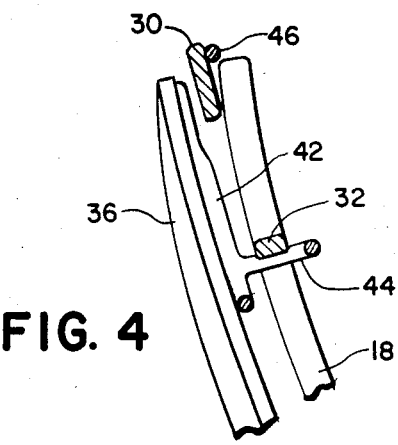

As more clearly shown in FIG. 3, the retaining wire 46 also bears against the central portion of the back of the brow bar 30. This is a resilient type of engagement that further ensures a snug and firm cooperation between the accessory 10 and the spectacle 12.

Although not shown in the drawings, the present invention envisions that the retaining wire can be relatively rigid and the finger resiliently flexible so that it can resiliently engage, in a snap-fit manner, the bottom of the nose bridge. Also, the wire 46 need not contact the central part of the brow bar.

Since certain changes may be made in the above-described accessory without departing from the scope of the invention herein involved, it is intended that all matter contained in the description or shown in the accompanying drawings shall be interpreted as illustrative and not in a limiting sense.

What is claimed is:

1. A sun shade device for releasable attachment to prescription glasses, the prescription glasses comprising a pair of lenses, a pair of lens frames each mounting one of the lenses, a nose bridge serving to space the lenses apart and means for providing an abutment extending above each of the lens frames, said sun shade device including:
    a pair of sun shades;
    means for connecting said sun shades in spaced apart orientation and for presenting a rearwardly extending projection adapted to extend under and rest releasably against the nose bridge of the prescription glasses when said sun shades are operably positioned with respect to the lenses of the prescription glasses; and
    means extending rearwardly from said sun shades for firmly and releasably engaging the edges of said abutments facing away from each other and for exerting a downwardly directed force against both frames of the prescription glasses and urging said projection against the nose bridge of the prescription glasses when said sun shades are operably positioned with respect to the lenses of the prescription glasses.

2. The invention of claim 1 wherein said abutment engaging means rests against the lens frames of the prescription glasses immediately adjacent each abutment thereof to exert said downwardly directed force thereagainst.

3. The invention of claim 1 wherein the means for providing an abutment includes a brow bar which defines the abutments and wherein said abutment engaging means is configured to firmly engage the rearwardly facing surface of the brow bar when said sun shades are operatively positioned with respect to the lenses of the prescription glasses.

4. The invention of claim 3 wherein said abutment engaging means comprises a wire-like member arranged to resiliently exert said downwardly directed force against the frames of the prescription glasses when said sun shades are operatively positioned with respect to the lenses of the prescription glasses.

5. The invention of claim 4 wherein said wire-like member is further arranged to yieldably engage the rearwardly facing surface of the brow bar when said sun shades are operatively positioned with respect to the lenses of the prescription glasses.

6. The invention of claim 5 wherein said rearwardly extending projection comprises a wire-like member arranged to yieldably engage the nose bridge when said sun shades are operatively positioned with respect to the lenses of the prescription glasses.

7. An optical accessory for releasable attachment to a pair of spectacles, the spectacles comprising a pair of optical elements, a pair of lens frames each mounting one of the elements, a nose bridge serving to space the elements apart and means for providing an abutment extending above each of the lens frames, said accessory including:
    a pair of optical members;
    means for connecting said members in spaced apart orientation and for presenting a rearwardly extending projection adapted to extend under and rest releasably against the nose bridge of the spectacles when said members are operably positioned with respect to the elements of the spectacles; and
    means extending rearwardly for firmly engaging the edges of the abutments facing away from each other and for exerting a downwardly directed force against both frames of the spectacles and for urging said projection against the nose bridge of the spectacles when said optical members are operably positioned with respect to the elements of the spectacles.

* * * * *